Patented June 14, 1949

2,473,131

UNITED STATES PATENT OFFICE 2,473,131

COLOR PHOTOGRAPHY

Robert D. Bensley, Chicago, Ill.

No Drawing. Application July 5, 1945,
Serial No. 603,401

3 Claims. (Cl. 95—2)

This invention relates to a process of color photography and the product thereof; and more particularly to a method of color photography in which all of the colors naturally present are reproduced by controlling the size and distribution of the particles of the light-sensitive medium.

Various methods of color photography are now known in which combinations of dyes are used to produce suitable colors. It has also been recognized that ordinary silver images may be treated to produce a single color not characteristic of the natural color of the image.

I have now discovered that natural color photographs may be produced from black and white negatives by utilizing the size and distribution of the silver particles to reproduce the natural color, and controlling development to produce and localize the colors in their proper positions.

In the preferred form of the invention a black and white positive of the image is produced, a very fine-grained emulsion is then deposited about or adjacent the picture and this fine-grained emulsion is then exposed through a negative of the picture, and then developed under careful control. During the development, the fine-grained particles of the silver in the emulsion appear to increase in size and change color as they do so. By proper selection of the positive and negative I have found that the natural colors may be produced substantially simultaneously as the particles grow in size.

As the fine-grained emulsion develops, the particles become light yellow, gradually become orange, and then reddish, and pass through the red to a brown and black. In my process I control the exposure as well as the distribution of the particles so that the red portions of the picture are more exposed than the yellow and, therefore, develop more rapidly and become red at the time the particles in the yellow portion of the image become yellow.

The explanation for the green and blue portions of my colored pictures is not entirely clear. It does appear that the green portions of the picture are produced by a combination of a very light yellow and the black residual portions of the black and white positive. The green portions do not, however, appear to go through a blue phase.

The blue color may be produced by some suborder of size of the silver particles which becomes noticeable only under conditions of very low exposure and consequent very slow development. In other words, the red and yellow portions of the pictures may go through a blue phase in the suborder of size so rapidly that it does not become noticeable.

Whatever the theoretical explanation may be, the fact remains that natural color photographs may be produced in all of the natural colors.

The invention is best carried out by making simultaneous negatives, one through an orange-red filter and exposed on a panchromatic film, and the other through a blue-green filter and exposed on orthochromatic film. (This film may, of coure, be panchromatic if desired.) Both negatives are then developed and fixed, and a positive is then prepared from the red-orange negative. It is very important that this positive be lightly exposed. A heavy black exposure will seriously interfere with proper coloration.

The orange-red positive, which of course is black and white, is then differentially resensitized—that is, it is impregnated with very fine-grained silver halide particles in the gelatine surrounding the image. This rehaloided or resensitized positive is then exposed through the blue-green negative in the normal manner and is then developed.

During development, those portions of the final picture which are to be red pass through a series of transformations ranging from canary yellow through orange, gradually merging into red. The yellow portions begin to show a hint of yellow color about the time the red portions are orange, and then become fully yellow at about the time that the red portions reach their proper color, although the yellow lags slightly behind the red. The greens do not begin to show color until the reds are verging on red, at which time the greens begin to show traces of yellow and then become green. The greens do not ordinarily acquire full green when the reds have acquired full red, but development may be carried on for some time after the reds have reached their proper color before the red begins to darken materially, and during this time the greens reach substantially full green. The blues are of course black in the beginning and they remain black until after the red has reached substantially full red. After holding the red at this stage for some time, however, the blues suddenly develop into their natural color.

The film print is then fixed in the usual manner. Strangely enough, the colored picture may be bleached in numerous ways and then restored to full color by proper development.

In making the negatives, an ordinary camera may be employed, and pictures taken successively if desired. It is preferred, however, to use a beam splitter camera. Negatives may, however, also be satisfactorily made by the use of commercial two-color negatives such as DuPont Dupac, or Zelccas motion picture film.

The following gives a detailed description of a suitable method of procedure. Negatives are made from the films in the ordinary manner.

An ordinary positive is then made from the red filter negative on positive stock or preferably on a stock of longer scale and slightly larger grain such as Eastman 33 or commercial stock film. This black and white positive is fixed in a non-hardening bath such as

| | | |
|---|---|---|
| Sodium thiosulfate (hypo) | grams | 300 |
| Potassium metabisulfate | do | 25 |
| Distilled water | cc | 1000 | for at least double the time necessary for the plate to look cleared. It is then washed in four changes of distilled water, five minutes for each change, and then for one to two hours in running water.

As stated before, this black and white positive should be lightly printed.

It is then resensitized. This resensitizing operation may be carried out by immersing the plate in a solution (such as 1.7%) of silver nitrate or any soluble silver salt capable of being converted to a chloride or bromide, such as ammoniacal silver nitrate, ammoniacal silver chloride or silver chlorate. The salt of preference by reason of cost, availability, and high solubility in water is silver nitrate. I find it advantageous to confer a slight acidity on the solution by the addition of 0.36 gram of citric acid per liter or, of a sufficient amount of dilute nitric, sulfuric, or tartaric acid to confer the same acidity.

The immersion in the above solution preferably lasts for about 2 minutes, after which the film or plate is rinsed for about 20 seconds and then immersed in a 10% chloride or bromide solution, preferably the former, for about 4 minutes. I prefer to use ammonium chloride, but other chlorides, such as sodium, potassium, magnesium or the like, will achieve satisfactory results. Ammonium bromide can also be used, but the other bromides tend to make a streaky or blotchy emulsion. The chlorides fix quickly in the physical developer and allow the operator to work in a bright light. The plate or film is then thoroughly washed and dried.

The resulting plate is a black and white positive with a very fine-grained deposit of silver salt or other photosensitive material, around, behind, or within the particles of silver in the plate. The plate may be handled readily in bright yellow light, and it is then matched in perfect register with the blue-green filter negative. While so held, the plate is exposed through the said blue-green filter negative, the exposure being strong but carefully controlled.

During this exposure the sensitive silver is screened not only by the green filter negative but also by the positive already existing. The result is also influenced by the fact that the amount of photosensitive material incorporated during the rehaloiding step is dependent upon the amount of photosensitized material (silver) already present in the plate. Thus, those portions of the image which were blue will be black in the positive, and the amount of silver already present will greatly reduce the amount of silver taken up during the rehaloiding step. On the other hand, the red parts of the image will be relatively light and will take up more of the rehaloiding material.

The result, it will be noted, accentuates greatly the differentiation between the red and blue ends of the picture. That is, the red portions are light, they have a maximum of resensitized material, and they also are exposed through the lightest portions of the blue-green negative. On the other hand, blue portions are dark in the positive, they have a minimum of resensitized material, and they are exposed through the darkest portions of the blue-green negative.

The plate is then developed in a suitable developer such as

| | | |
|---|---|---|
| Glycerine (parahydroxy phenyl-glycine) | gram | 1 |
| Sodium sulfite | do | 10 |
| Distilled water | cc | 100 |

At time of using add 2 cc. of 1.7% silver nitrate.

This is a slow physical developer which takes considerable time to develop, but in due course of time the image on the plate will gradually change to an image in full natural colors. This development may also be accomplished by highly restrained chemical developers. The glycine developer, after acting long enough to remove all silver chloride from the plate, can be replaced by a stronger physical developer such as Odell's formula, and development time so reduced to a few minutes.

The finished color picture must be fixed 5 minutes in the above hypo bath, washed thoroughly, and dried.

The foregoing detailed description has been given for clearness of understanding only, and no unnecessary limitations should be understood therefrom.

What I claim as new, and desire to secure by Letters Patent, is:

1. The method of natural color photography which comprises exposing a photosensitive silver halide medium to an image through an orange-red filter, developing and fixing the medium to produce a first negative, exposing a second photosensitive silver halide medium to the same image through a blue-green filter, developing and fixing the second medium to produce a second negative, lightly exposing a third photographic silver halide medium through said first negative, developing and fixing the third medium to produce a positive print, immersing the print in a 1.7% silver nitrate solution and then immersing the print in a 10% ammonium chloride solution to convert the silver nitrate to silver chloride, then re-exposing the print through the second negative and then developing the re-exposed print in a developer consisting of one hundred parts by weight of water, one part by weight of glycine, ten parts by weight of sodium sulphite and containing approximately two parts by weight of 1.7% silver nitrate solution.

2. The method of natural color photography which comprises exposing a photosensitive silver halide medium to an image through an orange-red filter, developing and fixing the medium to produce a first negative, exposing a second photosensitive silver halide medium to the same image through a blue-green filter, developing and fixing the second medium to produce a second negative, lightly exposing a third photographic silver halide medium through said first negative, developing and fixing the third medium to produce a print, immersing the print in a silver nitrate solution and then immersing the print in a soluble chloride solution adapted to convert the silver nitrate to silver chloride, re-exposing the print through the second negative, and then developing the re-exposed print in a developer comprising glycine and sodium sulphite in the proportion of 10 parts by weight of sodium sulphite to one part by weight of glycine.

3. The method of color photography which comprises exposing a photosensitive silver halide medium to an image through a first filter which is substantially opaque to blue light, developing and fixing the medium to produce a first negative, exposing a second photosensitive silver halide medium to the same image through a second filter which is substantially opaque to red light, developing and fixing the second medium to produce a second negative, lightly exposing a third photosensitive silver halide medium through said first negative, developing and fixing the third medium to produce a print, immersing the print in a dilute silver nitrate solution and then immersing the print in a soluble chloride solution adapted to convert the silver nitrate to silver chloride, re-exposing the print through the second negative and then developing the re-exposed print in a slow physical developer comprising an aqueous solution of sodium sulphite and glycine in the proportion of one part by weight of the glycine to ten parts by weight of the sodium sulphite in one hundred parts by weight of water, to which solution approximately two parts by weight of the water of a 1.7% silver nitrate solution has been added.

ROBERT D. BENSLEY.

REFERENCES CITED

The following references are of record in the file of this patent:

UNITED STATES PATENTS

| Number | Name | Date |
| --- | --- | --- |
| 1,538,816 | Ives | May 19, 1925 |
| 1,976,301 | Seymour et al | Oct. 9, 1934 |
| 1,991,136 | Capstaff | Feb. 12, 1935 |

OTHER REFERENCES

Wall: "History of Three Color Photography," 1925, Amer. Phot. Publ. Co., Boston, pages 403 & 417.